United States Patent
Sisto et al.

[11] Patent Number: 6,007,285
[45] Date of Patent: Dec. 28, 1999

[54] CANTILEVER FASTENER ASSEMBLY

[75] Inventors: Salvatore J. Sisto, East Brunswick; Edward S. Rudnicki, South Amboy, both of N.J.

[73] Assignee: Pinnacle Innovations, South River, N.J.

[21] Appl. No.: 08/492,211

[22] Filed: Jun. 19, 1995

[51] Int. Cl.$^6$ ............................................. F16B 21/00
[52] U.S. Cl. ............................................. 411/344; 411/340
[58] Field of Search ............................ 411/340, 344

[56] References Cited

U.S. PATENT DOCUMENTS

| | | | |
|---|---|---|---|
| 2,771,259 | 11/1956 | Laystrom | 411/340 |
| 3,596,861 | 8/1971 | Baldini | 248/224 |
| 4,770,583 | 9/1988 | Lindberg | 411/340 |
| 4,834,601 | 5/1989 | Schaap | 411/340 |
| 5,163,796 | 11/1992 | Belser | 411/342 |
| 5,209,621 | 5/1993 | Burbidge | 411/340 |
| 5,308,204 | 5/1994 | Moen | 411/344 |
| 5,381,308 | 1/1995 | Wolpert et al. | 411/344 |
| 5,425,609 | 6/1995 | Smith | 411/344 |

FOREIGN PATENT DOCUMENTS

| | | | |
|---|---|---|---|
| 2845000 | 4/1980 | Germany | 411/344 |
| 1536674 | 12/1978 | United Kingdom | 411/344 |

*Primary Examiner*—Steven N. Meyers
*Assistant Examiner*—Tuyet-Phuong Pham
*Attorney, Agent, or Firm*—Gottlieb, Rachman & Reisman, P.C.

[57] ABSTRACT

A fastener assembly which allows relatively heavy objects to be attached to either a hollow or a solid core wall by distributing the weight of such objects along a relatively long axial plane of support defined by an elongated cantilever structure. The apparatus includes an elongated tubular body having a flange or face plate at its proximal end. The tubular body defines an axial cavity dimensioned to receive a correspondingly dimensioned support member. When inserted into a properly dimensioned hole formed in a suitable support structure such, for example as a wall, ceiling, or floor, the rear face of the face plate contacts the portion of the support structure surface which surrounds the hole. The elongated tubular body, as well as the support member received therein, is maintained in position by an anchoring member which is disposed proximate the distal end of the tubular body. The anchor member comprises a base portion defining a central, threaded aperture. A plurality of elongated wings extend from the base portion in a direction toward the face plate of the tubular body. The wings are bendable in the direction of the tubular body to allow the anchoring member to be inserted through the wall hole. A threaded member inserted through the elongated body into the threaded aperture of the anchoring member is rotated to draw the wings of the anchoring member into contact with the inside surface of the wall panel.

11 Claims, 2 Drawing Sheets

CANTILEVER FASTENER ASSEMBLY

BACKGROUND OF THE INVENTION

1. Field of the Invention

The present invention relates generally to wall fasteners and in particular to fasteners used to secure objects to both solid core walls and hollow walls made of lightweight material, such as gypsum board or the like.

2. Description of the Background Art

Wall fasteners are typically installed in solid core walls or in hollow walls made of lightweight material, such as gypsum board, to attach objects to the wall. Such fasteners are useful in supporting relative heavy objects, such as framed pictures or shelves that are attached to the wall. According to prior practice, for example, fasteners installed in hollow walls are comprised of a threaded member, such as a bolt or screw, and an anchoring mechanism. Rotation of the threaded member causes the anchoring mechanism to expand and contact the inside of the wall to anchor the fastener in place. Common examples of such fasteners are the so-called "toggle" bolts and "moly" bolts. Various types of fasteners are described in the following U.S. Pat. Nos.: 4,136,599; 4,086,840; 4,077,300; 3,905,570; 3,874,264; 3,869,958; 3,752,032; 3,701,302; 3,605,846; 3,555,960; 3,534,797; 3,487,746; 3,366,405; 3,315,558; 3,211,044; 3,136,350; 3,104,582; and 1,978,935.

One problem associated prior art fasteners of the above type is that a portion of the anchoring mechanism is usually received within the hole in the wall through which the fastener is inserted. Therefore, stress exerted by heavy objects attached to the fastener on the outside of the wall may cause the fastener to pull outwardly through the opening. Another problem is that the fasteners must be carefully installed to insure that they are not over-torqued. Continued twisting of the threaded bolt or screw after the anchoring mechanism has contacted the inner surface of the wall will cause the anchoring mechanism to twist and dig into the inner surface of the wall. This digging action gouges the periphery of the wall hole, which causes the fastener to fit loosely within the wall and thereby increases the likelihood that the fastener will become dislodged from the wall.

Additionally, the supporting capacity/strength of conventional fastening structures is limited by a relatively short axis of rotation in the axial plane. As will be readily appreciated by those skilled in the art, this axis is defined by the distance between the points of support provided by the anchoring assembly and threaded member. In the case of prior art configurations such, for example, as the "moly" bolt, this distance is equivalent to the thickness of the wall or wallboard and is typically far too short to support large or heavy objects due to the high concentration of stresses over such a small area.

SUMMARY OF THE INVENTION

According to the present invention, the deficiencies associated with the prior art are avoided by a fastener assembly which allows relatively heavy objects to be attached to either a hollow or a solid core wall, the stresses exerted by such objects being distributed over a relatively wide area around the wall hole in which the fastener is anchored, and along a relatively long axial plane of support defined by an elongated cantilever structure.

The fastener assembly includes an elongated tubular body having a flange or face plate at its proximal end. The tubular body defines an axial cavity dimensioned to receive a correspondingly dimensioned support member. When inserted into a properly dimensioned hole formed in a suitable support structure such, for example as a wall, ceiling, or floor, the rear face of the face plate contacts the portion of the support structure surface which surrounds the hole.

The elongated tubular body, as well as the support member received therein, is maintained in position by an anchoring member which is disposed proximate the distal end of the tubular body. The anchor member comprises a base portion defining a central, threaded aperture. A plurality of elongated wings extend from the base portion in a direction toward the face plate of the tubular body. The wings are bendable in the direction of the tubular body to allow the anchoring member to be inserted through the wall hole. The wings are also spring biased so that they expand outwardly from the tubular body, in the case of a hollow wall, to engage the inner surface of the wall when the anchoring member clears the hole on the inside of the wall.

A threaded member such, for example, as a conventional screw or bolt, is insertable through the cavity of the elongated body and into the threaded aperture of the anchoring member. As will be readily appreciated by those skilled in the art, as the screw is rotated, the anchoring member is drawn closer to the face plate of the tubular body until the edge surfaces of the anchoring member wings contact the inside surface of the wall (in the case of a hollow wall). The outside diameter of the face plate is preferably selected so that the biased wings of the anchoring member do not extend beyond the peripheral edge(s) thereof. This ensures that stresses are distributed only over those portions of the surrounding wall which are in compression and thereby provides substantially enhanced mechanical strength and stability.

In accordance with an illustrative embodiment of the present invention, the length of the elongated wings of the anchoring member may be varied to accommodate walls of different thicknesses. By way of specific example, for a wall panel thickness of ⅝", the length of the elongated wings may be selected so that there is a ⅝" clearance between the forward tips of the wings and the interior surface of the wall panel when the base portion of the anchoring member has reached its limit of travel toward the face plate. It will, of course, be understood by those skilled in the art that factors other than the wall thickness such, for example, as the interior spacing between two wall boards of a hollow wall structure, may instead be considered to determine a single length that is suitable for most applications and that the length of the elongated wings need not be dependent upon the thickness of the wallboards.

In accordance with a presently preferred embodiment of the present invention, a compressible spacer element is inserted on the threaded member so as to be disposed between the base of the anchoring member and the distal end of the elongated tubular member. The length of the spacer element is preferably selected so as to establish a minimum clearance between the tips of the elongated wings and the interior surface of the wall panel while also providing initial, frictional engagement, at both ends, with the distal surface of the tubular body and the surface of the anchoring member base. This arrangement greatly simplifies installation by ensuring that the elongated wings may be brought into engagement with the interior surface of the wall panel once the threaded member has been rotated a sufficient number of times. In the initial, partially compressed condition, the frictional engagement of the spacer element with the tubular body and anchoring member prevents rotation of the anchoring assembly as the threaded member is rotated.

The various features of novelty which characterize the invention are pointed out with particularity in the claims annexed to and forming a part of the disclosure. For a better understanding of the invention, its operating advantages, and specific objects attained by its use, reference should be had to the accompanying drawings and descriptive matter in which there are illustrated and described several embodiments of the invention.

BRIEF DESCRIPTION OF THE DRAWINGS

The features and advantages of the present invention will be more readily understood from the following detailed description when read in conjunction with the accompanying drawings, in which.

DETAILED DESCRIPTION OF THE INVENTION

In the description which follows, like parts are marked throughout the specification and drawings, respectively. The drawings are not necessarily to scale and in some instances, proportions have been exaggerated in order to more clearly depict certain features of the invention.

In any event, and with reference now to FIGS. 1–4, a fastener assembly 10 constructed in accordance with an illustrative embodiment of the present invention will now be described in detail. Fastener assembly 10 includes an elongated tubular body 12 having a flange or face plate 14 at its proximal end. The tubular body 12 defines an axial cavity 16 (FIG. 2) dimensioned to receive a correspondingly dimensioned support member (not shown). Although both the tubular body 12 and face plate 14 are shown as having a circular cross-sectional profile, it should be noted that such a configuration is for illustrative purposes only. It is, in fact, contemplated that a variety of cross sectional profiles may be utilized, depending upon aesthetic considerations and the individual tastes of the user. Thus, for example, the face plate and/or tubular body may have an oval or semicircular (arched) profile, or a polygonal (e.g., triangular, trapezoidal, hexagonal, octagonal, etc.) cross sectional profile.

Figure 1:
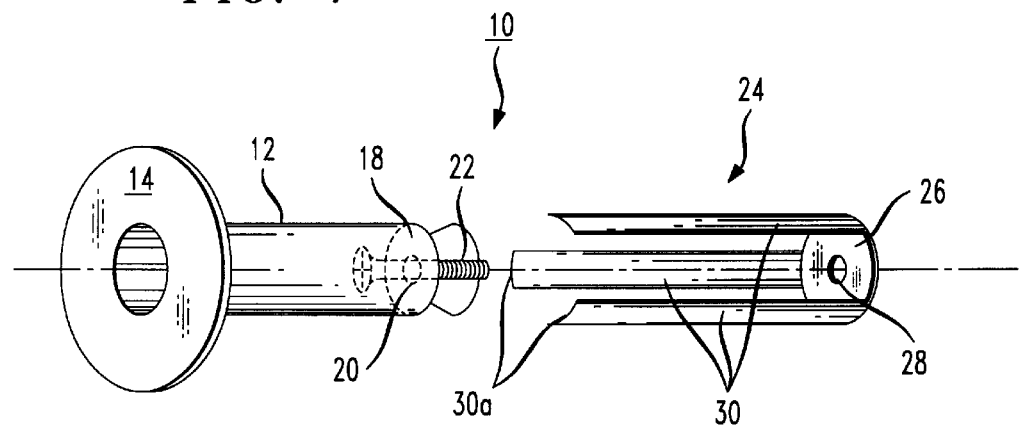
FIG. 1 is an exploded perspective view of a fastener assembly constructed in accordance with an illustrative embodiment of the present invention.
Figure 2:
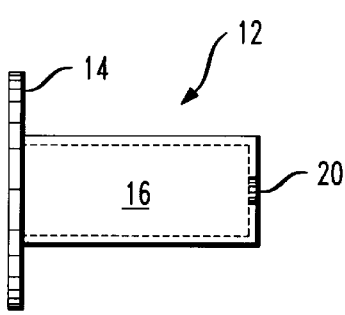
FIG. 2 is a cross sectional view depicting the interior construction of the tubular body member of the embodiment of FIG. 1.
Figure 3:
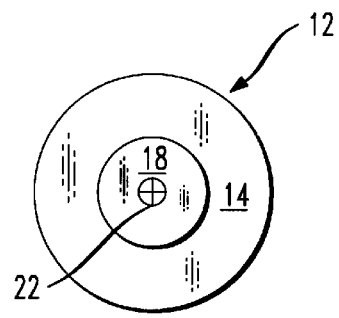
FIG. 3 is a front elevation view showing the external appearance of the tubular body member of FIG. 2 as installed.

Tubular body 12 further includes a distal end wall 18 having a centrally located aperture 20 dimensioned to receive threaded member 22 (FIGS. 2 and 3). When tubular body 12 is inserted into a properly dimensioned hole formed in a suitable support structure such, for example as a wall, ceiling, or floor, the rear face of the face plate contacts the portion of the support structure surface which surrounds the hole.

Figure 4:
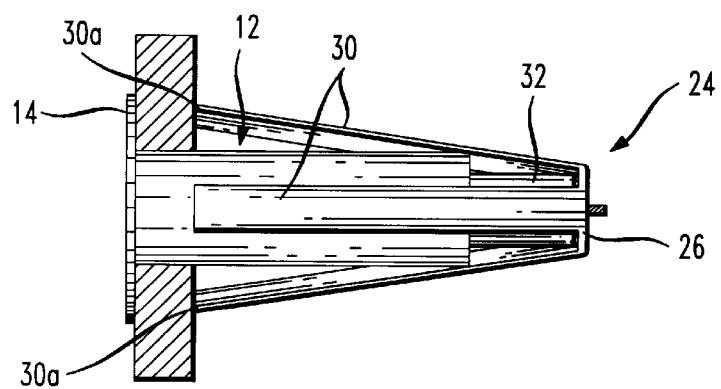
FIG. 4 is a side elevation view depicting the use of the fastener assembly of FIG. 1 on a hollow wall structure.

The elongated tubular body 12, as well as the support member received therein, is maintained in the position shown in FIG. 4 by an anchoring member 24 which is disposed proximate the distal end of the tubular body 12. The anchoring member 24 comprises a base portion 26 that defines a central aperture correspondingly threaded to receive threaded member 22. A plurality of elongated wings 30 extend from the base portion 26 in a direction toward the face plate 14 of tubular body 12. Optionally, the wings 30 may be bendable in the direction of the tubular body to allow the anchoring member 24 to be inserted through a wall hole. As best seen in FIG. 4, the wings 30 are also spring biased so that they expand outwardly from the tubular body, in the case of a hollow wall, to engage the inner surface of the wall when the anchoring member clears the hole on the inside surface of wall panel W.

Threaded member 22 which may be, for example, a conventional screw or bolt, is inserted through the cavity 16 of the elongated body and into the threaded aperture 28 of anchoring member 24. As will be readily appreciated by those skilled in the art, as threaded member 22 is rotated, the anchoring member 24 is drawn closer to face plate 14 until the edge surfaces 30a of anchoring member wings 30 contact the inside surface of the wall (as shown in FIG. 4).

The outside diameter of face plate 14 is preferably selected so that the biased wings 30 of the anchoring member 24 do not extend beyond the peripheral edge(s) thereof. This arrangement ensures that stresses are distributed only over those portions of the surrounding wall which are in compression and thereby provides substantially enhanced mechanical strength and stability.

With continued reference to FIG. 4, it will be observed that a compressible spacer element 32 is inserted on the threaded member so as to be disposed between the base 26 of anchoring member 24 and the distal end 18 of tubular body 12. The length of the spacer element is preferably selected so as to establish a minimum clearance between the tips 30a of the elongated wings 30 and the interior surface of wall panel W while also providing initial, frictional engagement, at both ends, with the distal surface of the tubular body and the surface of the anchoring member base. This arrangement greatly simplifies installation by ensuring that the elongated wings may be brought into engagement with the interior surface of the wall panel once the threaded member has been rotated a sufficient number of times. In the initial, partially compressed condition, the frictional engagement of the spacer element with the tubular body and anchoring member prevents rotation of the anchoring assembly as the threaded member is rotated. The compressible spacer element may be fabricated from any resilient material having a sufficient coefficient of friction, when partially or uncompressed, to minimize relative movement between the tubular body and anchoring member during installation.

Figure 5:
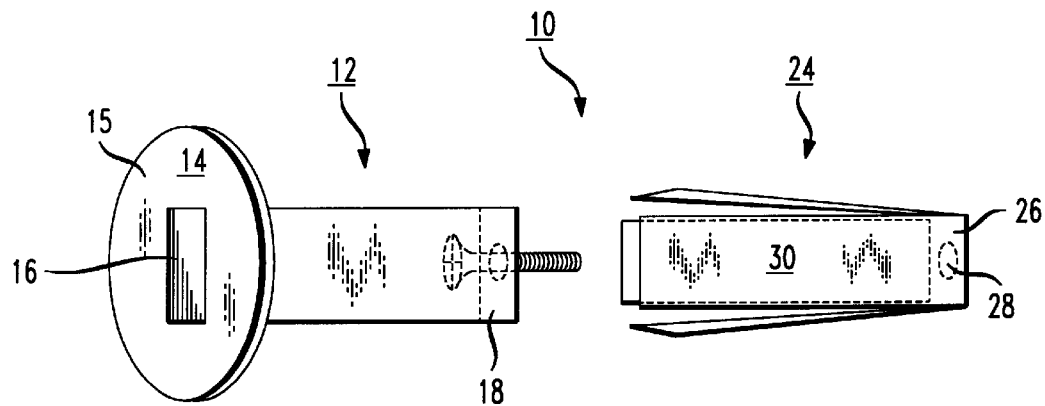
FIG. 5 is an exploded perspective view of a fastener assembly constructed in accordance with a modified embodiment of the present invention.

In the illustrative embodiment of FIGS. 1–4, the elongated cavity 16 is configured as an axial bore substantially circular in cross section. It will be readily appreciated by those skilled in the art, however, that the dimensions and cross sectional shape of the tubular body cavity may be modified as needed to accommodate the cross-sectional contour and dimensions of the support member to be received therein. Thus, by way of additional example, there is shown in FIG. 5 a fastener assembly constructed in accordance with a modified embodiment of the present invention. In the embodiment of FIG. 5, the elongated tubular body 12 of assembly 10 includes a face plate 14 and an elongated cavity 16 having a rectangular cross-sectional contour.

It will be readily appreciated by those skilled in the art that the length of the elongated wings of the anchoring member may be varied to accommodate walls of different thicknesses. Illustratively, for a wall panel thickness of 5/8", the length of the elongated wings may be selected so that there is a 5/8" clearance between the forward tips of the wings and the interior surface of the wall panel when the base portion of the anchoring member has reached its limit of travel toward the face plate. As such, the fastener assembly 10 of FIG. 5 lacks the spacer element of the embodiment previously described in connection with FIGS. 1–4.

Figure 6:
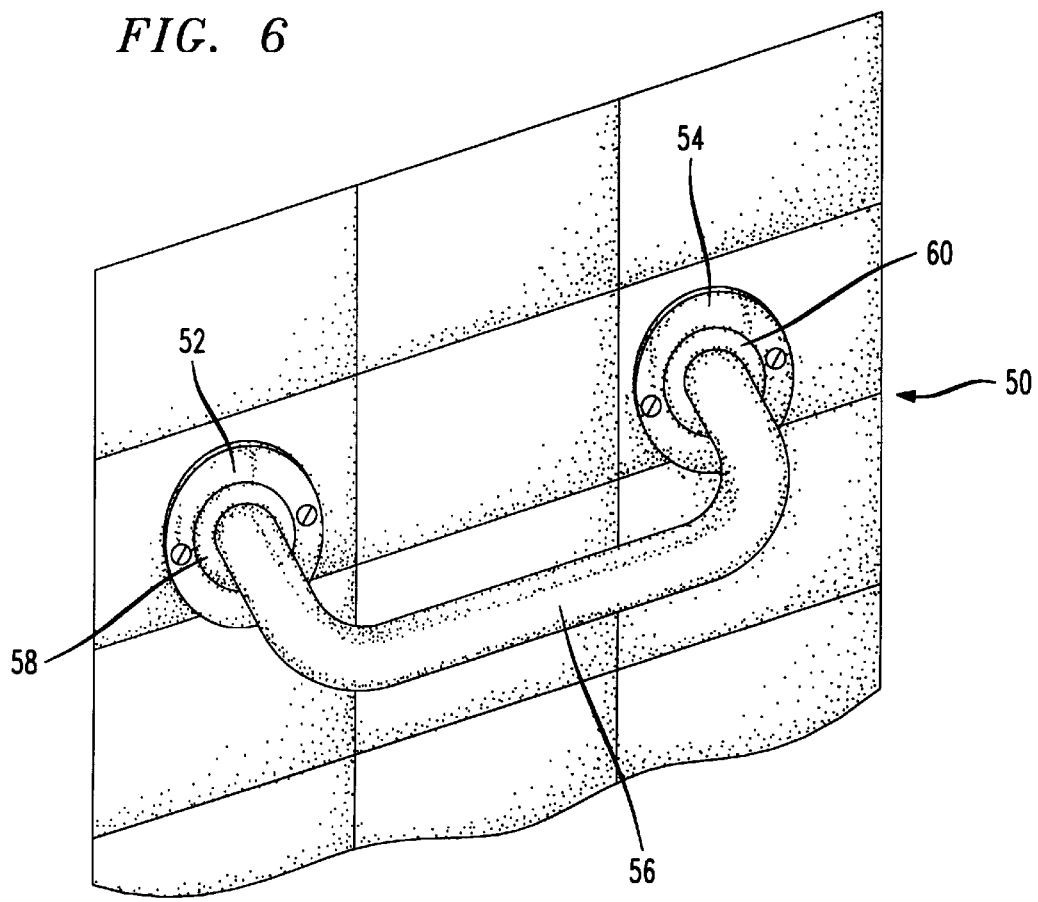
FIG. 6 is a perspective view depicting a handrail assembly constructed in accordance with the teachings of the present invention.

With reference now to FIG. 6, there is shown an illustrative installation of a handrail assembly 50 which advantageously utilizes a plurality of fastener assemblies. Frequently, it is impossible to retrofit handrail assemblies, suitable for use by the handicapped and the elderly, in such locations as, for example, bathrooms or the like, due to lack of suitably positioned mounting structures (studs, etc.). In such cases, it has heretofore been necessary to remove the existing wall panel and insert one or more additional studs or other solid structures so as to provide a sufficiently reliable connection. In accordance with the present invention, the need for such expensive retrofitting operations is completely avoided.

As seen in FIG. 6, handrail assembly 50 includes first and second fastener assemblies 52 and 54 which are essentially constructed in the manner described above. As shown, each end of bar 56 is received in the cavity of a corresponding fastener assembly. To facilitate a reliable connection, each end of grab bar 56 may, but need not include a mounting flange 58, 60 which flanges define suitable apertures alignable with corresponding apertures on the face plates of fastener assemblies 52 and 54 so that appropriately dimensioned threaded fasteners (not shown) may be utilized. Alternatively, a friction fit may be utilized to retain the ends of grab bar 56 within the tubular member cavities. If desired, an adhesive may be used within each tubular member cavity to enhance the interconnections between the grab bar and the fastener assemblies.

While the above embodiments and written description are directed towards an anchor or an attachment means suitable for hollow or easily traversed walls or ceilings, the present invention is equally suitable for use within a solid structure such as brick, concrete, or wood. For solid structures, a pilot hole is provided which permits the snug insertion of the wings and base of the anchoring member. Upon engagement with the distal end of the tubular body or, if applicable, the spacer, the wings of the anchoring member are expanded within and against the pilot hole. Depending upon the nature of the solid material, the wings may partially spread in certain types of soft wood or compressed wood products or where a slightly oversized pilot hole is provided. Where the material or pilot hole size does not permit expansion, the wings will deform. In either case, an extremely tight and secure frictional fit is obtained between the anchor and the solid material. A suitable adhesive may be used to further enhance the interconnection.

Fastener assemblies constructed in accordance with the present invention can carry a wide variety of attachments and assume a myriad of configurations. For instance, the fastener could be employed as an integral wall anchor to secure a cabinet to a hollow wall or function as a separate fastener in place of screws, nails, or rivets. Similarly, tubular body 12 could carry shelving brackets or define attachment means for detachable brackets as commonly used in shelving systems. In this regard, the elongated stem of an object to be supported, or of an underlying support member, may be merely inserted into the axial cavity of tubular body 12. To further enhance the reliability of the support arrangement, means may be included to selectively lock the inserted stem within the cavity of the tubular body. In the case of a tubular body having a circular cross-sectional profile, for example, the exterior surface of the stem and interior surface of the tubular body may be threaded for mating engagement with the object supporting stem being inserted by rotating the same until it is fully inserted into the tubular body.

It will be readily appreciated by those skilled in the art that other interlocking arrangements may also be employed. Thus, by way of further example, a flange or mounting collar secured to the object supporting stem may be provided with appropriate apertures and attached to the face plate 14 by threaded screws, an adhesive compound, or other suitable means. By way of yet another example, the object stem and axial cavity may be configured with inter-engaging cerrations to impede axial movement of the installed object step. Alternatively, the object supporting stem and axial cavity may be provided with a conventional twist-and-lock arrangement using, for example, an interference fit (frictionlock). By way of example, assuming an axial cavity having an ellipsodal cross-sectional profile, the object supporting stem may be configured with an ellipsoidal cross sectional profile extending at least a portion of its length and having a major axis which is slightly larger than the minor axis of the axial cavity but sufficiently smaller than the major axis of the axial cavity to permit the stem to be inserted when the axes of each are aligned. As will be readily ascertained by those skilled in the art, once the object supporting stem has been successfully introduced into the axial cavity, the former may be rotated until a frictional lock is achieved. In view of the foregoing illustrative examples, it should now be readily apparent that a variety of interlocking configurations may be achieved to ensure stable retention of an elongated object supporting stem in accordance with the present invention.

Alternative uses for the present fastener include most existing applications for conventional fasteners such as nails, screws, bolts or rivets. The anchor can be used to fasten sheet metal components, fasten building components to studs or other supports, and can provide a fastener which is safe to use in proximity to electrical sources since the fastener can be provided in non-conductive materials.

It will be readily appreciated by those skilled in the art that the fastener assembly of the present invention may be fabricated from any material having sufficient shear strength to withstand reasonable weights and loads placed upon the tubular body and any attachments. In addition, the wing material should be flexible to permit the necessary projection or flaring of the wings. Material such as nylon or plastic has been found to permit a unitary apparatus having the desired combination of desirable properties including strength, moldability and flexibility. While the preferred embodiments of the present invention are of plastic or rigid nylon, any moldable material including graphite, fiberglass, or polyethylene will suffice. An equivalent structure can be provided from other materials such, for example, as metal or wood, or alloys/composites thereof.

What is claimed is:

1. A fastener assembly for fastening objects to a supporting panel having an aperture, the supporting panel further having both exterior and interior surfaces and a specified thickness, comprising:

a tubular body having a main body portion dimensioned for insertion into the aperture and a face plate at a proximal end of the main body portion, said face plate having a cross sectional area greater than that of said main body portion and an interior surface engageable with the exterior surface of the supporting panel, and said tubular body defining an axial cavity and having a wall defining an aperture axially aligned with said axial cavity;

a threaded member dimensioned for insertion into the axial cavity and into the apertured wall of said tubular body; and an anchoring assembly having a base portion positionable proximate said apertured wall and at least three wing members extending axially from said base portion, said base portion defining a threaded aperture correspondingly threaded to receive said threaded member, and each of said wing members being manipulable from an outwardly biased spread position preventing withdrawal of the anchoring assembly through the aperture to a folded position facilitating insertion into the aperture;

wherein each of said wing members includes a proximal tip portion engageable with respective interior surface portions of the supporting panel, and wherein following insertion into the aperture of the supporting panel said anchoring assembly is movable, by rotation of said threaded member, from a first position in which said wing members are in said spread position and in which said proximal tip portions are a first distance, greater than said specified thickness, from the interior surface of said face plate to a second position in which said proximal tip portions engage the interior surface of the supporting panel, said wing members being sufficiently rigid such that said proximal tip portions engage substantially the same interior surface portions of the supporting panel despite continued rotation of said threaded member after the anchoring assembly reaches the second position so as to place at least a region of the supporting panel covered by the face plate in compression when said anchoring assembly is in said second position.

2. The fastener assembly of claim 1, further comprising a compressible spacer having an axial bore dimensioned to receive said threaded member, said spacer being positionable in contact between the apertured wall of the tubular body and the anchoring assembly and operable to prevent rotation of said anchoring assembly during movement from said first position to said second position.

3. The fastener assembly of claim 2, wherein said spacer is comprised of a resilient material.

4. The fastener assembly of claim 1, wherein said anchoring assembly and said tubular body are comprised of a molded plastic material.

5. The fastener assembly of claim 1, wherein the axial cavity of said tubular body has a circular cross sectional contour dimensioned to receive an elongated support member.

6. The fastener assembly of claim 1, wherein the face plate of said tubular body has a circular shape and wherein the wings of said anchoring assembly are disposed in a radial pattern and lie along a circular path having a diameter less than that of said face plate.

7. The fastener assembly of claim 1, wherein the axial cavity of said tubular body has a rectangular cross sectional contour dimensioned to receive an elongated support member.

8. A grab rail assembly securable to a supporting panel having at least two apertures, the supporting panel further having both exterior and interior surfaces and a specified thickness, comprising:

an elongated member having a first end and a second end;

first and second tubular bodies, each said tubular body having a main body portion dimensioned for insertion into one of the apertures in the supporting panel and a face plate at a proximal end of the main body portion having a cross sectional area greater than that of said main body portion, each said tubular body defining an axial cavity and having a wall defining an aperture axially aligned with said axial cavity;

first and second threaded members dimensioned for insertion into the axial cavity and the apertured wall of said first and second tubular bodies, respectively;

means for attaching the first and second ends of said elongated member to said first and second tubular bodies, respectively; and first and second anchoring assemblies, each said assembly having a base portion positionable proximate the apertured wall of a corresponding tubular body and at least three wing members extending axially from said base portion, each of said wing members being manipulable from an outwardly biased spread position to a folded position facilitating insertion into the aperture and said base portion defining a threaded aperture correspondingly threaded to receive a corresponding one of said first and second threaded members;

wherein each of the wing members of a corresponding anchoring assembly includes a proximal tip portion engageable with respective interior surface portions of the supporting panel, and wherein said corresponding anchoring assembly, following insertion into an aperture of the supporting panel, is movable by rotation of said threaded member from a first position in which said wing members are in said spread position and in which said proximal tip portions are a first distance, greater than said specified thickness, from the interior surface of said face plate to a second position in which said proximal tip portions engage the interior surface of the supporting panel, said wing members being sufficiently rigid such that said proximal tip portions engage substantially the same interior surface portions of the supporting panel despite continued rotation of said threaded member after the anchoring assembly reaches the second position so as to place at least a region of the supporting panel covered by the face plate in compression when said corresponding anchoring assembly is in said second position.

9. The grab rail assembly of claim 8, wherein the axial cavity of each said tubular body is dimensioned to receive an end of said elongated member.

10. A method of fastening objects to a supporting panel having an aperture, the supporting panel further having both exterior and interior surfaces and a specified thickness, comprising the steps of:

providing a fastener assembly including a tubular body having a main body portion and a face plate at a proximal end of the main body portion, the face plate having a cross sectional area greater than that of the main body portion and an interior surface engageable with the exterior surface of the supporting panel, and the tubular body defining an axial cavity and having an apertured wall proximate a distal end thereof;

a threaded member; and an anchoring assembly having a base portion positionable proximate said apertured wall and at least three resilient wing members extending axially from said base portion, said base portion defining a threaded aperture correspondingly threaded to receive said threaded member, and each of said resilient wing members being manipulable from an outwardly biased spread position preventing withdrawal of the anchoring assembly through the aperture to a folded position facilitating insertion into the aperture and being sufficiently rigid as to place at least a region of the supporting panel covered by the face plate in compression when forward surface portions thereof engage interior surface portions of the supporting panel;

positioning the fastener assembly within the supporting panel aperture such that forward tip surfaces of the resilient wing members are a first distance, greater than the specified thickness, from the interior surface of the face plate; and rotating the threaded member to thereby bring the forward tip surfaces of the resilient wing members into contact with said interior surface portions of the supporting panel and thereby place the supporting panel in compression in a region covered by the face plate, the wing members remaining substantially in the spread position despite continued rotation of said threaded member after the forward tip surfaces of said resilient wing members contact the interior surface portions of the supporting panel.

11. A fastener assembly for fastening objects to a supporting panel having an aperture, the supporting panel further having both exterior and interior surfaces and a specified thickness, comprising:

a tubular body having a main body portion dimensioned for insertion into the aperture and a face plate at a proximal end of the main body portion, said face plate having a cross sectional area greater than that of said main body portion and an interior surface engageable with the exterior surface of the supporting panel, and said tubular body defining an axial cavity;

a threaded member dimensioned for insertion into the axial cavity; and an anchoring assembly having a base portion positionable proximate a distal end of said tubular body and at least three wing members extending axially from said base portion, said base portion defining a threaded aperture correspondingly threaded to receive said threaded member, and said wing members being manipulable between a folded position facilitating insertion into the aperture and a diverging position preventing withdrawal of the anchoring assembly through the aperture;

wherein each of said wing members includes a forward tip surface engageable with respective interior surface portions of the supporting panel, and wherein following insertion into the aperture of the supporting panel said anchoring assembly is movable, by rotation of said threaded member, from an initial position in which said forward tip surfaces are a first distance, greater than said specified thickness, from the interior surface of said face plate, to said diverging position in which said forward tip surfaces engage the interior surface of the supporting panel, said wing members being sufficiently rigid in said diverging position such that said forward tip surfaces engage substantially the same interior surface portions of the supporting panel despite continued rotation of said threaded member after the anchoring assembly reaches the diverging position to thereby place at least a region of the supporting panel covered by the face plate in compression when said anchoring assembly is in said diverging position.

* * * * *